United States Patent
Sehier et al.

(10) Patent No.: US 7,031,283 B2
(45) Date of Patent: Apr. 18, 2006

(54) METHOD AND SYSTEM FOR ENHANCING CHANNEL CAPACITY IN A POINT TO MULTIPOINT RADIO COMMUNICATIONS SYSTEM HAVING DIFFERENT KINDS OF TERMINALS

(75) Inventors: Philippe Sehier, SaintGermain enLaye (FR); Emmanuel Lemois, Paris (FR); Thierry Quignon, Toulouse (FR)

(73) Assignee: Alcatel, Paris (FR)

( * ) Notice: Subject to any disclaimer, the term of this patent is extended or adjusted under 35 U.S.C. 154(b) by 857 days.

(21) Appl. No.: 09/950,771

(22) Filed: Sep. 13, 2001

(65) Prior Publication Data

US 2002/0031140 A1    Mar. 14, 2002

(30) Foreign Application Priority Data

Sep. 14, 2000    (EP)    .................................. 00402543

(51) Int. Cl.
*H04B 7/216*    (2006.01)
(52) U.S. Cl. ...................................... 370/335; 370/342
(58) Field of Classification Search ................ 370/329, 370/335, 337, 341, 342, 347, 468, 348, 431, 370/441, 442
See application file for complete search history.

(56) References Cited

U.S. PATENT DOCUMENTS

| | | | | |
|---|---|---|---|---|
| 5,410,568 A | * | 4/1995 | Schilling ..................... | 370/342 |
| 5,442,625 A | * | 8/1995 | Gitlin et al. ................ | 370/342 |
| 5,745,480 A | * | 4/1998 | Behtash et al. ............. | 370/252 |
| 6,061,359 A | * | 5/2000 | Schilling et al. ............ | 370/441 |
| 6,069,883 A | * | 5/2000 | Ejzak et al. ................. | 370/335 |
| 6,108,369 A | * | 8/2000 | Ovesjo et al. .............. | 375/146 |
| 6,278,701 B1 | * | 8/2001 | Ayyagari et al. ............ | 370/335 |
| 6,456,605 B1 | * | 9/2002 | Laakso et al. .............. | 370/330 |
| 6,456,606 B1 | * | 9/2002 | Terasawa .................... | 370/331 |
| 6,665,296 B1 | * | 12/2003 | Sturza et al. ............... | 370/389 |

FOREIGN PATENT DOCUMENTS

| | | |
|---|---|---|
| EP | 627 827 A2 | 12/1994 |
| EP | 863 682 A1 | 9/1998 |
| EP | 905 939 A2 | 3/1999 |

OTHER PUBLICATIONS

Berruto E. et al "Variable-Rate for the Basic Speech Service in UMTS", Proceedings of the Vehicular Technology Conference, U.S. New York, IEEE, vol. Conf. 43, May 18, 1993, pp. 520-523.

* cited by examiner

*Primary Examiner*—Ajit Patel
*Assistant Examiner*—Andrew C. Lee
(74) *Attorney, Agent, or Firm*—Sughrue Mion, PLLC

(57) ABSTRACT

Method and system for enhancing channel capacity in a Point-to Multipoint radio communications system that includes terminal stations (12) of different kinds, such as residential terminals and business terminals, with different link budget requirements i.e. different signal-to-noise ratio. The method is characterized by the selective use of different channel coding codes such as forward error correction (FEC) codes, in the different concurrent channels, depending on a pre-defined category of an addressed subscriber. The multiplexing method used may be CDMA (Code Division Multiple Access) and TDMA (Time Division Multiple Access). Each terminal station (12) is in turn equipped only with an appropriate decoder, depending on its kind, e.g. residential or business.

9 Claims, 3 Drawing Sheets

METHOD AND SYSTEM FOR ENHANCING CHANNEL CAPACITY IN A POINT TO MULTIPOINT RADIO COMMUNICATIONS SYSTEM HAVING DIFFERENT KINDS OF TERMINALS

FIELD OF THE INVENTION

The present invention relates to a method and a system for enhancing channel capacity in a point to multipoint radio system, said system having different kinds of terminals such as residential applications terminals and business applications terminals, wherein said terminals present different requirements depending on said applications. The invention is of special application (but not limited) to cases where CDMA (code division multiple access) method is used for multiplexing.

BACKGROUND OF THE INVENTION

In a point to multipoint radio system, such as in satellite radio access systems or in cellular mobile communications systems, the resources (band width) to be assigned are limited as they must be shared between the different communications which are active at the same time. Different methods are applied in order to share said limited resources. CDMA, FDMA (Frequency Division Multiple Access) or TDMA (Time Division Multiple Access) are among some of the methods known in the art.

In CDMA, the bitrate of every digital communication, be it from a data source or from a voice source after voice coding, is sent to the air modulating a carrier and using a pre-assigned bandwidth. The carrier is modulated using known techniques such as PSK (Phase Shift Keying), using different amplitude values in different carrier phases, giving rise to the so-called "constellation size". In CDMA systems, all active communications send their modulated signals in the same carrier. In order to allow radio terminals to recover their corresponding signals, each signal is multiplied by a code. The result of each multiplication process modulates the same carrier and the addition of all the modulated signals is then sent through the transmission channel. The main transmission channel effects are signal attenuation, and noise and interference addition. . At the receiver end, the signal is multiplied again by the same corresponding code used in the transmission. The codes used for different transmissions are orthogonal as is well known in the related art. In every system, a particular set of orthogonal codes is used. The code bitrate is faster than the user bitrate, so the signal power is spread and converted into an absolute value. The ratio between the chip rate of the spreading code and the user bit rate is known as "Processing Gain".

In order to protect the information against errors, the user bitrate is passed through a forward error correction code (FEC) before spreading and transmission. The codes considered in the present invention can be of any sort, including concatenated codes, and, within this category they can be the concatenation with repetition codes. The added bits resulting from such multiplication allow the receiver to improve the Bit Error Rate (BER). The ratio between coded bits rate and user input bits rate is known as FEC rate (R). By way of example it may be said that R=½ means two output bits per user bit. Thus the more bits are added, or in other words the lower R is, the more the BER improvement can increase.

Rate efficiency is then defined as the total number of user bits transmitted in frequency (per hertz) and per time unit in accordance with the following relationship:

$$R_{eff} = (N_c \times R \times M)/G$$

Where:
$N_c$ is the number of orthogonal codes used
R is FEC rate
M is constellation size
G is spreading gain.

It therefore turns out that the rate efficiency is directly proportional to the value of R, i.e. better efficiencies are obtained for higher values of R.

On the other hand, in a TDM/TDMA system, the channels are distinguished using different time intervals or slots. Sometimes, slot capacity is limited by the system design, such that the more bits are added in the convolutional, the less effective payload is sent in the channel. In this case, if the same FEC is used, the channels addressed which require less signal to noise ratio, waste payload capacity with the unnecessary extra FEC bits. In the applications considered in the present invention, the use of CDMA and TDMA systems at the same time is also contemplated.

One solution can be the use of slots of different lengths depending on the required FEC. However, this solution has the drawback of requiring the addition of a frame header (frame descriptor). In certain applications, particularly in the present design of a Skybridge (a known satellite system for wireless access), terminals try to detect and demodulate all the spreading codes. The terminal then discards the packets which are destined to other terminals and selects the packets sent for its own. In order to do this, the terminal uses a cyclic redundancy check (CRC). This code is added after dividing the packet payload by a fixed divider. The added CRC is the rest of the division process. In the receiving side, the operation is reproduced and the same CRC must be obtained. This is possible because all the packets and time slots have the same structure. Now, if we assume that time slots have different lengths or structures, it is necessary to indicate the position and structure of each packet. This can be done using a frame descriptor inserted in each frame. This descriptor provides all the information needed to process the signal. A frame descriptor has several drawbacks such as complexity, capacity waste (the descriptor must be transmitted with sufficient power in order that all terminals can detect it) and possibly latency increase.

DESCRIPTION OF THE INVENTION

The solution proposed by the present invention is based on the use of different protecting codes, namely forward error correction codes (FEC), with different rates, for each kind of terminal where there may be two or more kinds of terminals, depending on the required received signal level. The base station (or gateway) would apply an appropriate code to each channel depending on the kind of the terminal being addressed. The terminals are in turn equipped with an appropriate FEC decoder depending on their kind as to their required signal to noise ratio. With this solution, the channel is optimized as long as only the required redundant bits (FEC) are added.

Accordingly an object of the present invention is that of providing a method for enhancing channel capacity in a point to multipoint radio communications system comprising at least a base station and a plurality of terminal stations where said terminal stations present different requirements in relation to applications of radio digital channels, characterized in that the method comprises the steps of:

determining a radio resource consumption factor of a terminal station according to said application requirements;

selecting a forward error correction code for coding a channel to be transmitted to a terminal station, said code being selected so as to optimize said radio resource consumption factor of said terminal station;

using said forward error correction code for coding said channel; and multiplexing concurrent channels having different forward error correction codings for transmission thereof.

According to an aspect of the invention, said radio resource consumption factor is determined as a function of a quality of service as well as of a link budget in the connection.

According to another aspect of the invention, the selection of said forward error correction code is made dynamically from among a set of pre-defined configurations, according to an instantaneous link budget of said terminal with the base station.

According to another aspect of the invention, the multiplexing is performed using code division multiple access (CDMA) technique.

According to another aspect of the invention, the multiplexing is performed using code division multiple access (CDMA) and time division multiple access (TDMA) techniques simultaneously.

Another object of the present invention is that of providing a system for enhancing channel capacity in a point to multipoint radio communications system comprising at least a base station and a plurality of terminal stations where said terminal stations present different requirements in relation to applications of radio digital channels, characterized in that the system comprises:

means for determining a radio resource consumption factor of a terminal station according to said application requirements;

coding means for coding a channel to be transmitted to a terminal station according to a forward error correction code, said code being selected so as to optimize said radio resource consumption factor of said terminal station;

means for multiplexing concurrent channels having different forward error correction codings for transmission thereof.

According to another aspect of the invention, each terminal station is equipped with a decoder suitable for decoding a forward error correction coding selected so as to optimize the channel capacity of said terminal station.

According to another aspect of the invention, the decoder may be parametrized for all the configurations needed.

According to another aspect of the invention, said means for coding a channel is included in a base station.

These and other features of the invention are discussed in further detail in the following description as well as in the claims.

BRIEF DESCRIPTION OF THE DRAWINGS

The present invention will be better understood by the aid of the following detailed description and the accompanying drawings.

EXAMPLE OF A PREFERRED EMBODIMENT

Figure 1:
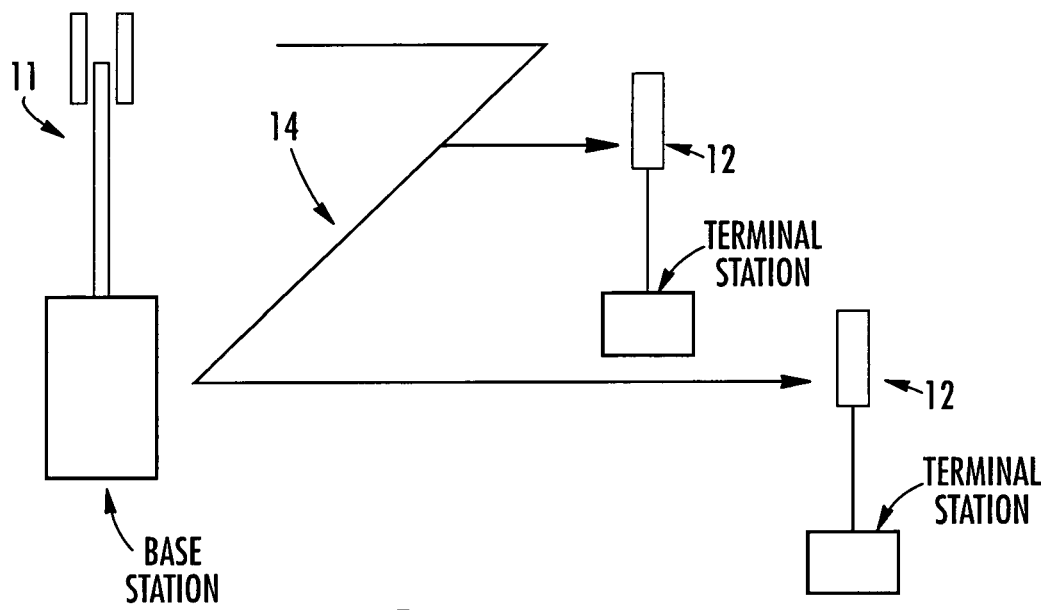
FIG. 1 is a schematic representation of a typical radio point to multipoint communications system having a base station and several terminal stations.
Figure 1A:
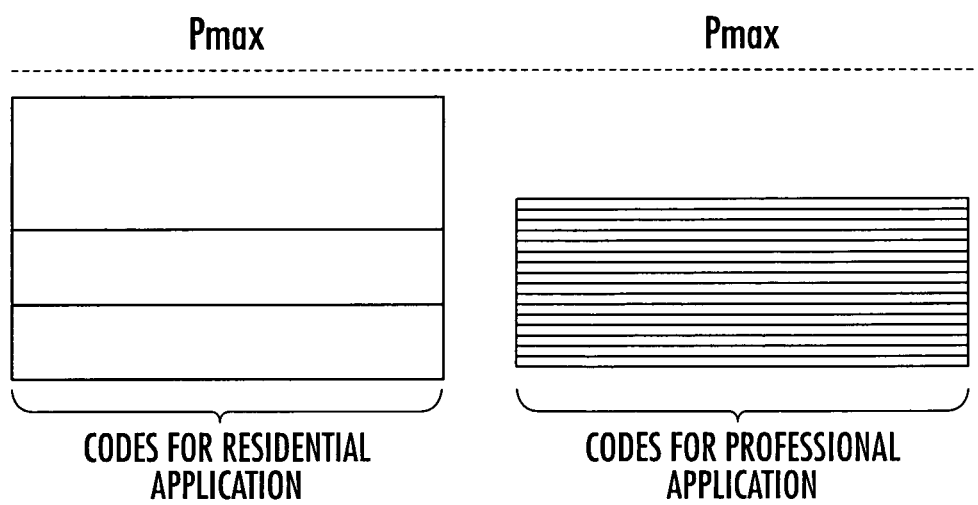
FIG. 1a is a representation of power values at the transmitter side according to an example based on the system of FIG. 1.

The basic concept of code selection according to the invention is described hereafter. In practice, a professional (business) terminal should use a relatively high rate code. In consequence the signal to noise ratio (SNR) needed at the receiver side is higher than the SNR for a residential terminal. The factor to be taken into account is the transmitted power. This factor is generally lower than for a residential terminal as professional terminals have larger antennas, and in consequence a better link budget. The limitation comes from the maximum transmitted power. FIG. 1a represents the powers at the transmitter side. At the left side of the figure, where a residential application is represented, the number of codes is limited by the maximum power Pmax. At the right side of the figure, a professional application is represented where the number of codes is maximum (equal to the size of the alphabet of orthogonal signals); however the maximum power Pmax is not reached. It this latter case, it would be preferable to use a higher rate code (which although needs a slightly increased power, it does not matter since this power is available), and which allows to transmit more packets.

Figure 2:
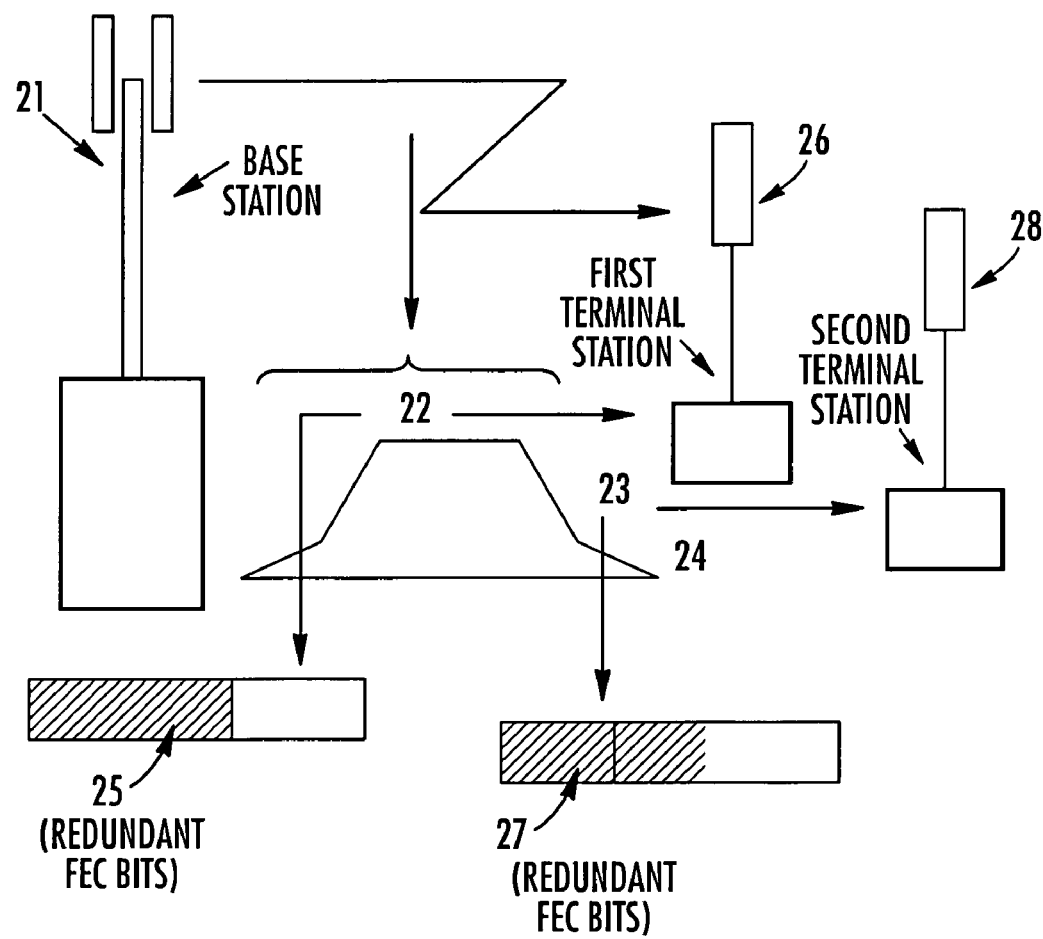
FIG. 2 shows different code multiplexing configuration in said communications system as a function of the required signal to noise ratio.

In a point to multipoint environment, the base station spreads the different signals using orthogonal codes, and every radio terminal station recovers its signal. Depending on the characteristics of each particular terminal station, the signal to be recovered must present a ratio figure taking into account the addition of the other remaining signals and the noise. Therefore, as long as the total power is limited, more or less codes can be multiplexed depending on the required signal to noise ratio figure. In FIG. 2, different requirements of for example residential and business applications are shown wherein a first signal 22 having a noise level 24 is transmitted from a base station 21 to a first terminal station 26 and a second signal 23 having the same noise level 24 is transmitted from said base station 21 to a second terminal station 28, the latter having different characteristics as to the resource applications than the first terminal station 26. Thus different signal to noise ratios in each of the mentioned transmissions 22 and 23 give rise to different signal to noise ratios which in turn give rise to correspondingly different redundant FEC bits 25 and 27 to be incorporated respectively in each channel.

In practice, the terminals that require a higher signal to noise ratio are, for instance, professional terminals and the one requiring lower signal to noise ratio may be residential applications terminals.

The channel bitrate is the result of the addition to the user bitrate of a set of redundant bits which are used to allow the recovering of errors caused by transmission defects. Said added redundant bits, as already mentioned, give rise to the forward error correction (FEC) codes. There are diverse FEC mechanisms known in the art, such as the so-called Convolutional codes, linear block codes, and concatenated codes. These categories include also 'turbo codes' as well as trivial repetition codes.

If the number of bits per transmission period, or frame, is pre-set for all the channels, the number of user bits per frame is not optimized if the same number of redundant bits are added to the different kinds of terminals regarding their signal to noise requirement (same FEC is used). However, if a selective FEC is used in channels addressed to the terminals that require a lower signal to noise ratio, the channel capacity can be used to transport more payload bits, instead of redundant bits hence higher channel capacity is achieved. In this manner, inside a frame, more or less data packets are sent depending on the kind of addressed terminal (residential or professional), and the added FEC.

Thus the base station, depending on the addressed terminal, protects the user bitrate, using one or another FEC, with more or less redundant bits, in such a way that the used FEC code matches with the one equipped in the receiving terminal station. The addressed terminal may be identified in each case by its corresponding radio resource consumption factor. This factor is in turn determined by obtaining information related to the quality of service in the connection as well as the link budget.

As to the quality of service, this factor may be determined in real time or in non-real time and in relation to the data rate (peak, average or sustainable) values.

Furthermore, the link budget is determined by the kind of terminal, the propagation attenuation and the interference level.

Figure 3:
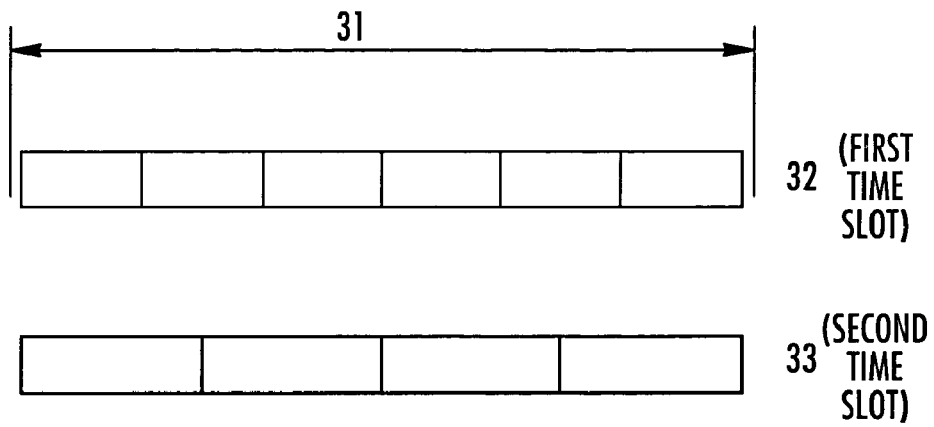
FIG. 3 represents different user bitrates depending on the FEC rate for terminal stations of different kinds.

FIG. 3 illustrates an example of an arrangement in which a first time slot 32 is used for transmission to a terminal station covering 6 cells, e.g. professional terminals, and a second time slot 33 is used for transmission to a terminal station covering 4 cells e.g residential terminals. Both time slots have the same length 31.

Figure 4:
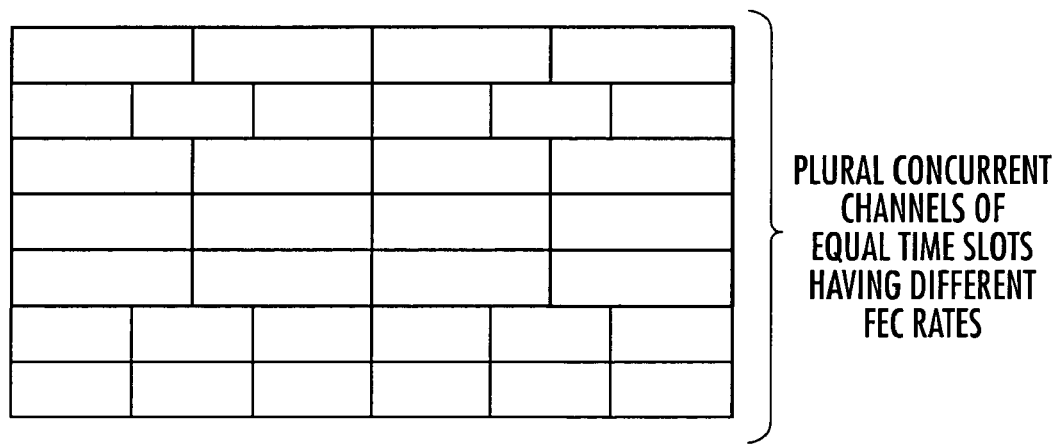
FIG. 4 represents a plurality of concurrent channels of equal time slots having different FEC rates arranged for transmission to different kinds of terminal stations according to the present invention.

As a result a structure of a plurality of concurrent channels including packets sent to both kinds of terminals may be represented in an exemplary manner as shown in FIG. 4.

Alternatively, it is to be noted that the code used to address a terminal is chosen dynamically among a set of pre-defined configurations, according to the instantaneous link budget of this terminal with the base station. In this case, each terminal is equipped with a set of decoders, or by a single decoder which can be parameterized for all the configurations needed.

It is also to be noted that although the example of the embodiment provided by the present invention has been presented in relation to two different kinds of terminals, the solution is also applicable to systems with more than two kinds of terminals. In such cases, more than two code configurations would be used according to the requirements of each case.

The solution provided by the present invention has the advantage of being also applicable to TDM systems. Other advantages of the proposed solution are that only one FEC decoder is used in each kind of terminal; modulation and demodulation parts to be used are common for all coding configurations; the use of a frame descriptor is eliminated as described hereinabove and the fact that the solution proposed may also be extended to downlink transmission of communications systems using onboard processing.

The invention claimed is:

1. Method for enhancing channel capacity in a point to multipoint radio communications system comprising at least a base station (11; 21) and a plurality of terminal stations (12) where said terminal stations present different requirements in relation to applications of radio digital channels, characterized in that the method comprises the steps of:
    determining a radio resource consumption factor of a terminal station (12; 26; 28) according to said application requirements;
    selecting a forward error correction code for coding a channel to be transmitted to a terminal station (12; 26; 28), said code being selected so as to optimize said radio resource consumption factor of said terminal station (12; 26; 28);
    using said forward error correction code for coding said channel; and
    multiplexing concurrent channels having different forward error correction codings for transmission thereof.

2. Method according to claim 1, wherein said radio resource consumption factor is determined as a function of a quality of service as well as of a link budget in the connection.

3. Method according to claim 1, wherein the selection of said forward error correction code is made dynamically from among a set of pre-defined configurations, according to an instantaneous link budget of said terminal with the base station.

4. Method according to claim 1, wherein the multiplexing is performed using code division multiple access (CDMA) technique.

5. Method according to claim 1, wherein the multiplexing is performed using code division multiple access (CDMA) and time division multiple access (TDMA) techniques simultaneously.

6. System for enhancing channel capacity in a point to multipoint radio communications system comprising at least a base station (11; 21) and a plurality of terminal stations (12; 26; 28) where said terminal stations present different requirements in relation to applications of radio digital channels, characterized in that the system comprises:
    means for determining a radio resource consumption factor of a terminal station (12; 26; 28) according to said application requirements;
    coding means (11; 21) for coding a channel to be transmitted to a terminal station (12; 26; 28) according to a forward error correction code, said code being selected so as to optimize said radio resource consumption factor of said terminal station (12; 26; 28);
    means (11; 21) for multiplexing concurrent channels having different forward error correction codings for transmission thereof.

7. System according to claim 6 wherein each terminal station is equipped with a decoder suitable for decoding a forward error correction coding selected so as to optimize the radio resource consumption factor of said terminal station (12; 26; 28).

8. System according to claim 7 wherein the decoder is parametrized for all the configurations needed.

9. System according to claim 6 wherein said means for coding a channel is included in a base station.

* * * * *